March 12, 1940.   J. F. HARRISON ET AL   2,193,367
ROAD WORKING MACHINERY
Filed Aug. 26, 1938   3 Sheets-Sheet 1
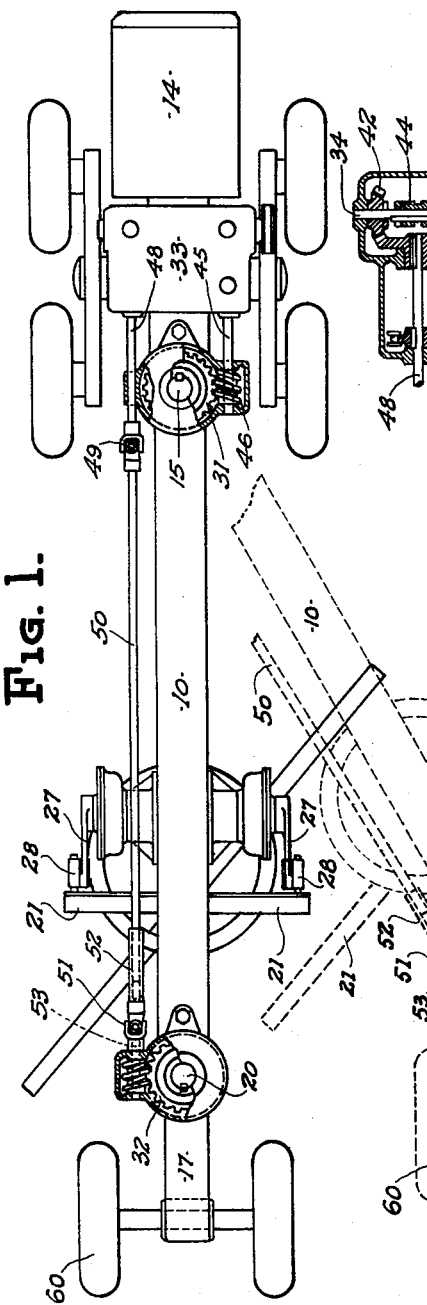
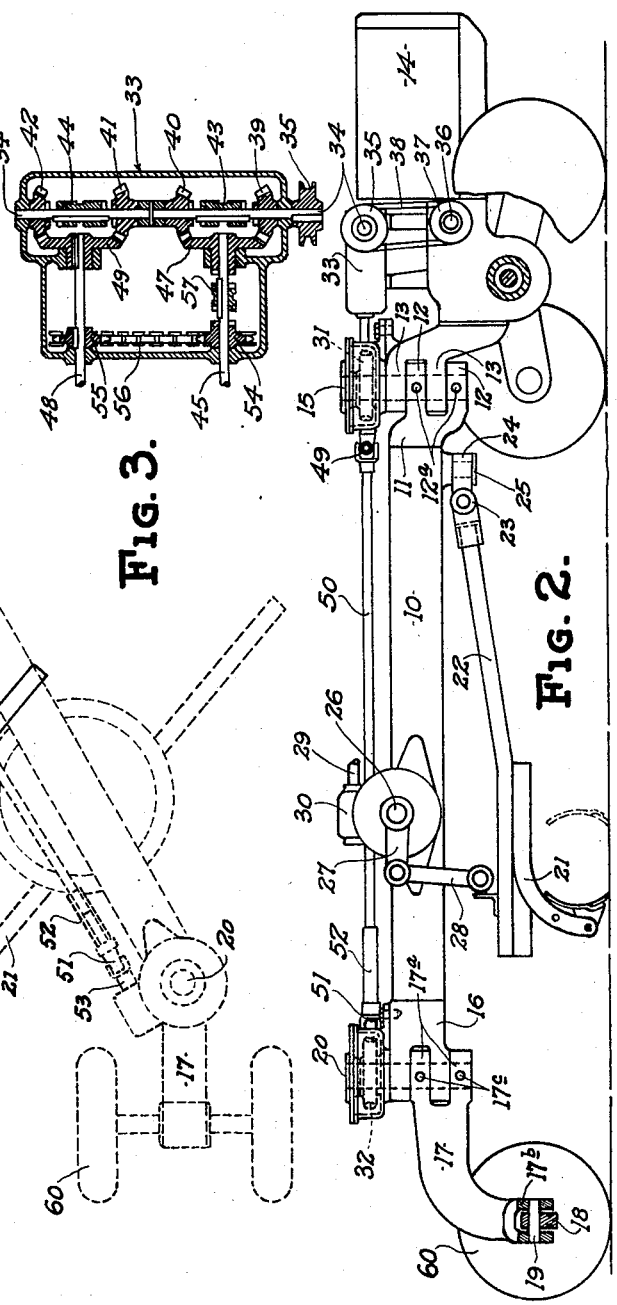
INVENTORS.
JOHN F. HARRISON
HOLLIS B. CRUM
BY Hull, Brock & West
ATTORNEYS.

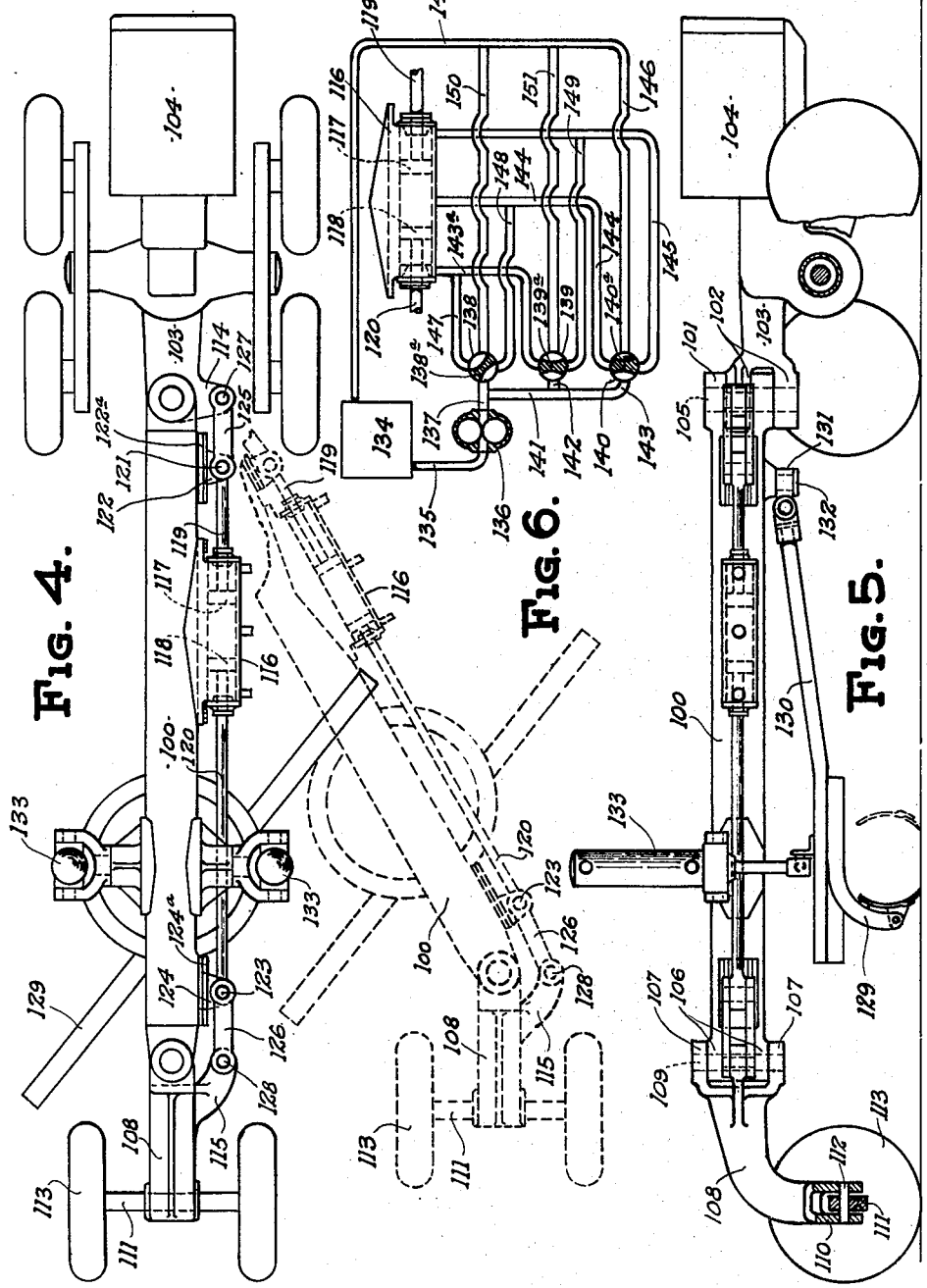

March 12, 1940.　　J. F. HARRISON ET AL　　2,193,367
ROAD WORKING MACHINERY
Filed Aug. 26, 1938　　3 Sheets-Sheet 3
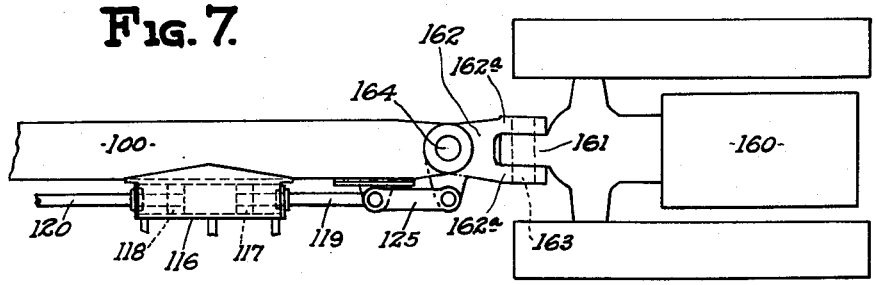
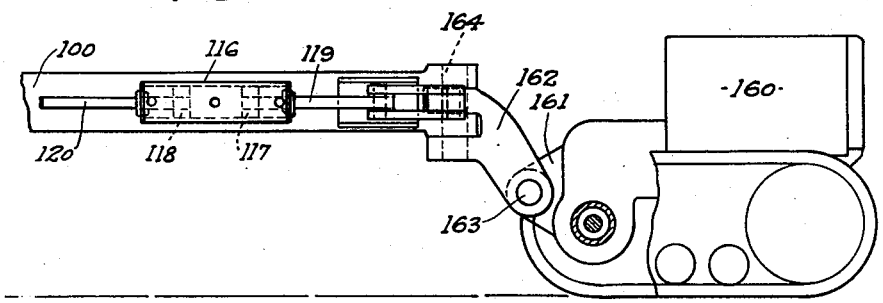
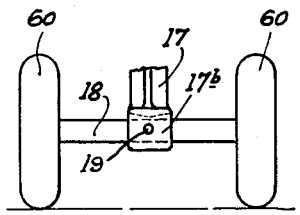
INVENTORS.
JOHN F. HARRISON
HOLLIS B. CRUM
BY Hull, Brock & West
ATTORNEYS.

Patented Mar. 12, 1940

2,193,367

UNITED STATES PATENT OFFICE 2,193,367

ROAD WORKING MACHINERY

John F. Harrison and Hollis B. Crum, Marion, Ohio

Application August 26, 1938, Serial No. 226,958

8 Claims. (Cl. 280—33.5)

This invention relates to road working machinery, and more particularly to the type of road working machinery shown in our application No. 169,531, filed October 18, 1937.

In the aforesaid application, we have provided an extremely simple and flexible machine adapted for operating on various types of road building and road maintenance work as well as on various types of road contour.

In the aforesaid application, there is disclosed and claimed an elongated frame having a tractor pivotally connected to one end thereof, a wheeled support pivotally connected to the other end thereof, with means for varying the angular relation of both the tractor and the wheeled support with respect to the frame whereby the machine may be operated with the wheeled support in offset parallel relation with respect to the tractor as well as whereby the angular relation of both the tractor and the wheeled support may be varied with respect to the frame for steering purposes. In the aforesaid application, the specific means for controlling the angular relation of the tractor with respect to the frame consists of cylinders and piston rods, while the specific means for varying the angular relation between the wheeled support and the said frame consists of an extensible and contractible link connected to arms projecting laterally from the rear of the tractor and from the front of the wheeled support, a variation in the length of the said link being obtained by including a cylinder as a portion of the link, with means for supplying fluid under pressure to the said cylinder.

A more limited object of the invention of this application consists in the substitution of means, other than those shown in our aforesaid application, for controlling the angular relation between the tractor and the wheeled support and the frame.

In the drawings herein, Fig. 1 is a plan view of a power grader embodying our invention, the positions of the parts when the wheeled support is in parallel but offset relation to the tractor being shown in dot-and-dash lines; Fig. 2 a fragmentary side elevation of the power grader shown in Fig. 1; and Fig. 3 a detail in section through the power-control box; Fig. 4 a view, similar to Fig. 1, of a modified form of the apparatus shown in the former view; Fig. 5 a side elevation of the apparatus shown in Fig. 4; Fig. 6 a diagrammatic view of the fluid pressure system for controlling the angular relation between the tractor and the wheeled support and the frame; Fig. 7 a plan view of the tractor-end of the apparatus shown in Fig. 4 and showing the use with the frame of stable traction means; Fig. 8 a side elevation of the part of our apparatus shown in Fig. 7; and Fig. 9 is a rear elevation of the wheeled support used in various forms of our apparatus shown herein.

Describing our apparatus first in connection with Figs. 1-3 inclusive, 10 denotes the main frame, which is in the form of an elongated beam or pipe to one end of which is rigidly secured an element 11 comprising upper and lower horizontal forks 12, the said forks mating with forks 13 secured to and projecting rearwardly from the frame of the tractor 14, the tractor and the frame being pivotally connected by a vertical pivot pin 15 to which the forks 12 are secured by pins 12ᵃ. The frame 10 is provided at its opposite end with a forked fitting 16, the forks of said fitting mating with forks 17ᵃ carried by a caster element 17 which extends downwardly, terminating in a bifurcated lower end 17ᵇ to which the axle 18 is pivoted by means of a central pin 19. The caster element 17 and the frame 10 are connected by means of the vertical pivot pin 20 to which the forks 17ᵃ are secured by pins 17ᶜ.

The earth-working means, indicated generally at 21, may be attached to the frame by means of suitable bars 22 pivotally connected at 23 to an element 24, for movement about a horizontal axis, the element 24 in turn being pivoted about a stud 25 for movement about a vertical axis. Any conventional controls may be used for altering the position of the earth-working means with respect to the frame, both vertically and laterally, and for maintaining any set relation of said elements. The means indicated conventionally herein comprises a horizontal shaft 26 extending transversely of the frame 10, arms 27 secured to the opposite ends of said shaft, and links 28 connecting said arms with the earth-working means. The shaft 26 may be rotated by any convenient means, as by a shaft 29 which may be provided with a worm within the casing 30 meshing with a worm gear on said shaft.

For the purpose of varying the angular relation between the tractor and the wheeled support and the frame 10, we have provided the following construction and arrangement of parts: 31 denotes a worm gear, keyed to the pin 15, and 32 a similar worm gear, keyed to the pin 20. 33 denotes a power control box, preferably mounted upon the tractor frame. 34 denotes a shaft which extends across and is journaled in the front of the tractor frame, said shaft projecting through one end of the box and being provided thereon with a pulley 35 adapted to be driven from the power take-off shaft 36 through a pulley 37 on the latter shaft and a V-belt 38. Mounted on the shaft 34 are the idle bevel gears 39, 40, 41 and 42. Interposed between the bevel gears 39 and 40 is a jaw clutch 43; and interposed between the bevel gears 41 and 42 is a jaw clutch 44. 45 denotes a shaft having at one end thereof a worm 46 meshing with the worm gear 31 and having at its opposite end a bevel gear 47 meshing with the bevel gears 39 and 40. 48 denotes a shaft having on one end thereof a bevel gear 49 meshing with the bevel gears 41 and 42. This shaft extends through the power-control box and is connected by a universal joint 49 with a shaft 50 the opposite end of which is connected by a universal joint 51, including the spline 52, with the shaft 53 having the worm 17 thereon. Idly mounted on the shaft 45, within the power control box, is a sprocket 54; and rigid with the shaft 48 is a cooperating sprocket 55, said sprockets being connected by a sprocket chain 56. A jaw clutch 57 on the shaft 45 is interposed between the bevel gear 47 and the sprocket 54.

With the parts constructed and arranged as described, the operation will be as follows: When it is desired to adjust the angular relation of both the wheeled support and the tractor with reference to the frame 10, the clutch 57 is engaged with the idle sprocket 54 and the clutch 44 is engaged with either of the gears 41 and 42. The shaft 48 will then be driven through the gear 49 and the shaft 45 through the sprockets 54 and 55 and chain 56. The tractor and the wheeled support may be set at the desired angle on either side of the frame 10, dependent upon the engagement of the clutch 44 with one or the other of the gears 41 and 42.

When it is desired to control the angular relation of the tractor and the wheeled support to the frame independently of each other, the clutch 57 is engaged with the bevel gear 47. The jaw clutch 43 is then moved into engagement with either of the bevel gears 39 and 40, and the shaft 45 will be rotated in either direction, imparting like movement to the worm 46 and setting the tractor at the desired angle with respect to the frame, on either side thereof. Likewise, if the clutch 44 is engaged with either of the gears 41 and 42, while the sprocket 54 is idle, corresponding direction of rotation is imparted to the shafts 48, 50 and 53 whereby the wheeled support will be set at the desired angle with respect to the frame, on either side thereof. The spline 52 may be considered as an extension of the shaft 50, enabling the latter to be longitudinally extensible and contractible in length to accommodate variations in the angular relation between the adjacent portion of the frame 10 and the wheeled support, the wheels whereof are indicated at 60.

In Figs. 4–8 inclusive, there is shown a modification of our invention wherein the angular relation of the tractor and of the wheeled support with reference to the frame are controlled by hydraulic means. Referring more particularly to Figs. 4–6, inclusive, 100 denotes the frame having forks 101 at one end which cooperate with mating forks 102 carried by a portion 103 of the frame of the tractor, indicated at 104. A vertical pin 105 connects the aforesaid forks. The other end of the frame is also provided with a vertical hub 106 which is received between forks 107 on a caster element 108, the pin 109 extending through the forks and the hub providing a vertical pivotal connection between the frame and the caster element. This caster element is similar to the caster element in the preceding form of our invention and is provided with a bifurcated lower end 110, to which the axle 111 is pivotally connected by means of a central pin 12, the said axle having the wheels 113 thereon. 14 denotes an arm projecting laterally from the end of the tractor frame 103 adjacent to the frame 100 and 115 an arm extending laterally from the caster element 108. These arms are connected by extensible and contractible linkage means comprising a cylinder 116 carried by the frame 100, pistons 117 and 118 in said cylinder and piston rods 119, 120 connected to said pistons, respectively, the former piston rod having its outer end pivotally connected by a pin 121 to an arm 122 projecting laterally from the adjacent portion of the frame 100 and slidably mounted thereon at 122ª. The piston rod 120 has its outer end connected in like manner by the pin 123 and to the arm 124 projecting laterally from the opposite portion of the frame 100 and slidably mounted thereon at 124ª. Links 125 and 126 are each pivotally connected at one end to the pins 121 and 123, respectively, and at their other ends to pins 127, 128 carried by the arms 114, 115, respectively.

The earth working means, indicated generally at 129, may be attached to the frame by means of suitable bars 130 pivoted to an element 131 for movement about a horizontal axis, the element 131 being in turn pivoted about a stud 132 for movement about a vertical axis. Any conventional controls 133 may be used for altering the position of the earth working means both vertically and radially and for maintaining any set relations of said elements.

In Fig. 6 there is shown a diagrammatic view of the hydraulic system whereby the supply of fluid to the cylinder 116 is controlled, for the purpose of enabling either the tractor and the wheeled support to be set at any desired angle with respect to the frame, independently of each other; also to enable both the tractor and the wheeled support to be set in unison at any desired angle with respect to the frame.

In this view, 134 denotes the sump for oil or other similar liquid, the liquid flowing by gravity through the pipe 135, to the gear pump 136. 137 denotes the outlet pipe leading from said pump, said pipe communicating directly with the valve casing 138 and indirectly with the valve casings 139 and 140 through the pipe 141 and the connections 142, 143. From the top of the valve casing 140, pipe 144 leads to the central portion of the cylinder between the pistons 117, 118; and from the bottom of the valve casing 140, pipe 145 leads to the end of the cylinder 116 behind the piston 117. Also from the side of the valve casing 140, opposite the side to which the branch pipe 143 is connected, pipe 146 leads back to the sump. A pipe 143ª leads from the top of the valve casing 139 to the other end of the cylinder 116, behind the piston 118 therein. A pipe 149 from the bottom of the said casing leads to the pipe 145; and a pipe 151 leads from the side of the said casing, which is opposite the connection 142, to the pipe 146. A pipe 147 is connected to the top of the valve casing 138 and also to the pipe 143ª; and the pipe 148 connected to the bottom of the valve casing is connected to the pipe 144.

With the parts arranged as described, the manner in which the hydraulic controls operate can be readily understood. When the valve 138ª is in the open position shown in Fig. 6 while the other valves are closed, the oil or other operating liquid is supplied through pipes 148 and 144 between the pistons 117 and 118. The piston 117 is held against movement by the closing of the valve 140ª. However, the piston 118 is free to move, the liquid being delivered thereby through pipes 143ª, 147 and 150 to the pipe 146 leading to the sump. This will result in moving the piston rod 120 to the left, thereby setting the wheeled support at an angle with respect to the frame, as shown in the dot-and-dash lines in Fig. 4. To reverse the movement of the piston 118, one merely reverses the position of the valve 138ª.

When the valves 138ª and 140ª are closed, and valve 139 is in the open position, the pressure fluid can flow through pipes 149 and 145 to the end of the cylinder 116, behind the piston 117, and the liquid between the piston 118 and the other end of the cylinder can be discharged through pipes 143ª and 151 into the sump pipe 146, thereby permitting both piston rods 119 and 120 to be moved rearwardly. This will result in placing the wheeled support and the frame 100 in the position shown by the dot-and-dash lines in Fig. 4. To reverse the movement of both pistons 117 and 118, merely reverse the position of the valve 139ª.

With both valves 138ª and 139ª closed and the valve 140ª in the open position, pressure liquid will be supplied through pipe 145 to the right hand end of the cylinder 116, thereby tending to move the piston 117 to the left. This movement is permitted by the venting of the cylinder, between the pistons, through pipes 144 and 146, into the sump. By moving the valve 140ª to the reverse position, the movement of the piston 117 may be reversed. By so operating the valve 140ª, the tractor will be moved to one side or the other of the frame.

Figs. 7 and 8 show the tractor end of the apparatus which is illustrated in Figs. 4 and 6, with the substitution of a stable traction means, in the form of a tractor of the crawler type, for the tractor shown in the preceding views. Where such a stable tractor is provided, a double pivotal connection between the frame 100 and the tractor is desirable. The tractor is shown generally at 160, being provided with a frame extension 161 received between the forks 162ª of a connecting member 162 extending downwardly from the adjacent end of the frame 100. The frame extension 162 is pivotally connected to the connecting member by a horizontal pivot pin 163 and the connecting member in turn is connected to the frame 100 by a vertical pivot pin 164.

In all other respects, the form of our invention shown in Figs. 7 and 8 is identical with that shown in Figs. 4–6 inclusive.

It will be understood that road working machinery constructed in accordance with our invention herein is capable of being operated in either direction by the tractor.

Having thus described our invention, what we claim is:

1. In a road working device, in combination, traction means, rolling supporting means, an elongated frame, means connecting one end of the said frame with said traction means and the other end of said frame with the rolling supporting means so as to be capable of angular movement with respect to both of said means about substantially vertical axes, operative connections between said traction means and said supporting means for automatically varying the angular relation of one of said means with respect to said frame in response to a change in angular relation between the said frame and the other of said means and in such direction as to maintain parallelism in the direction of movement of the traction means and the supporting means, a power take-off from said traction means, a shaft driven by said power take-off, and means controlled by the rotation of said shaft for operating the aforesaid connections.

2. In a road working device, in combination, traction means, rolling supporting means, an elongated frame, means including a vertically disposed pin for pivotally connecting the traction means with one end of said frame, means including a vertically disposed pin for pivotally connecting the rolling supporting means with the opposite end of the said frame, a gear secured to each of the said pins, a shaft having a gear thereon meshing with the gear on the first-mentioned pin, a shaft having a gear thereon meshing with the gear on the second-mentioned pin, a traction power take-off, a shaft driven thereby, and connections between the last mentioned shaft and the two first-mentioned shafts for rotating the two first-mentioned shafts either independently of or in unison with each other.

3. In the combination recited in claim 2, the second shaft being longitudinally extensible and contractible.

4. In a road working device, in combination, a traction element, a rolling supporting element, an elongated frame element, means including a vertically disposed pin for pivotally connecting the traction element with one end of said frame element, said pin having a driving connection with one of the two last mentioned elements, means including a pin for pivotally connecting the rolling supporting element with the opposite end of the said frame element, said pin having a driving connection with one of the two last mentioned elements, a gear secured to each of the said pins, a shaft having a gear thereon meshing with the gear on the first-mentioned pin, a shaft having a gear thereon meshing with the gear on the second-mentioned pin, a traction power take-off, a shaft driven thereby, and connections between the last mentioned shaft and the two first mentioned shafts for rotating the two first mentioned shafts either independently of or in unison with each other.

5. In the combination recited in claim 4, the second shaft being longitudinally extensible and contractible.

6. In a road working device, in combination, a traction element, a rolling supporting element, an elongated frame element, means including a vertically disposed pin for pivotally connecting the traction element to one end of said frame element, said pin having a driving connection with one of the two last mentioned elements, means including a vertically disposed pin for pivotally connecting the rolling supporting element to the opposite end of the said frame element, said pin having a driving connection with one of the two last mentioned elements, a gear secured to each of the said pins, a shaft having a gear thereon meshing with one side of the gear on the first mentioned pin, a shaft having a gear thereon meshing with the opposite side of the gear on the second mentioned pin, a third shaft and means for driving the same, and connections between the last mentioned shaft and the two first mentioned shafts for rotating the two first mentioned shafts either independently of or in unison with each other.

7. In the combination recited in claim 6, the means for driving the third shaft comprising a traction power take-off, and connections for driving the third shaft from the said traction power take-off.

8. In a road working device, in combination, traction means, rolling supporting means, an elongated frame, means for pivotally connecting the traction means with one end of said frame, means for pivotally connecting the rolling supporting means with the opposite end of said frame, a traction power take-off, a shaft driven thereby, a shaft for varying the angular relation between the traction means and the elongated frame, a shaft for varying the angular relation between the rolling supporting means and the elongated frame, and connections between the first mentioned shaft and the second and third shafts for rotating the said second and third shafts either independently of or in unison with each other.

JOHN F. HARRISON.
HOLLIS B. CRUM.